United States Patent [19]

JaQuay

[11] Patent Number: 4,626,979
[45] Date of Patent: Dec. 2, 1986

[54] ANTICIPATORY FEEDBACK TECHNIQUE FOR PULSE WIDTH MODULATED POWER SUPPLY

[75] Inventor: John W. JaQuay, San Diego, Calif.

[73] Assignee: Diego Power, San Diego, Calif.

[21] Appl. No.: 704,336

[22] Filed: Feb. 22, 1985

[51] Int. Cl.⁴ .............................................. H02M 1/12
[52] U.S. Cl. ........................................ 363/41; 363/98; 363/132
[58] Field of Search ................... 363/41, 98, 131, 132, 363/17, 78, 16, 19, 46

[56] References Cited

U.S. PATENT DOCUMENTS

| | | | |
|---|---|---|---|
| 3,214,672 | 10/1965 | Watkins | 363/42 |
| 3,310,730 | 3/1967 | Ruch | 363/98 |
| 3,324,376 | 6/1967 | Hunt | 363/42 |
| 3,360,709 | 12/1967 | Etter | 363/41 |
| 3,406,328 | 10/1968 | Studtmann | 363/41 |
| 3,409,817 | 11/1968 | Gillett | 363/42 |
| 3,412,316 | 11/1968 | Kernick | 363/133 |
| 3,416,062 | 11/1968 | Bernhard | 363/40 |
| 3,423,663 | 1/1969 | Payne | 363/41 |
| 3,445,742 | 5/1969 | Moscardi | 318/805 |
| 3,558,915 | 1/1971 | Wood | 307/516 |
| 3,566,148 | 2/1971 | Wood | 307/106 |
| 3,614,590 | 10/1971 | Kernick | 363/42 |
| 3,636,430 | 1/1972 | Kernick et al. | 363/41 |
| 3,648,150 | 3/1972 | Kernick | 363/41 |
| 3,710,229 | 1/1973 | Jessee | 363/41 |
| 3,781,634 | 12/1973 | Jessee | 363/41 |
| 4,067,057 | 1/1978 | Taddeo | 363/41 |
| 4,071,812 | 1/1978 | Walker | 363/80 |
| 4,346,332 | 8/1982 | Walden | 315/307 |
| 4,387,421 | 6/1983 | Zach | 364/148 |
| 4,424,557 | 1/1984 | Steigerwald | 363/98 |

FOREIGN PATENT DOCUMENTS

| | | |
|---|---|---|
| 1230489 | 12/1966 | Fed. Rep. of Germany . |
| 984567 | 2/1965 | United Kingdom . |
| 1048682 | 11/1966 | United Kingdom . |

*Primary Examiner*—Patrick R. Salce
*Assistant Examiner*—Emanuel Todd Voeltz
*Attorney, Agent, or Firm*—Knobbe, Martens, Olson & Bear

[57] ABSTRACT

A pulse width modulated inverter system includes a comparator for comparing an output voltage with the sum of a reference voltage and a maximum allowable ripple voltage. The comparator further includes an input from the ripple current in a filter capacitor to determine when to switch between two DC voltage buses such that the maximum allowable ripple voltage will not be exceeded. The ripple voltage is constrained such that when the current is switched to maintain the ripple voltage within the set limits, the pulse width modulation frequency is maintained at a desired frequency.

24 Claims, 12 Drawing Figures

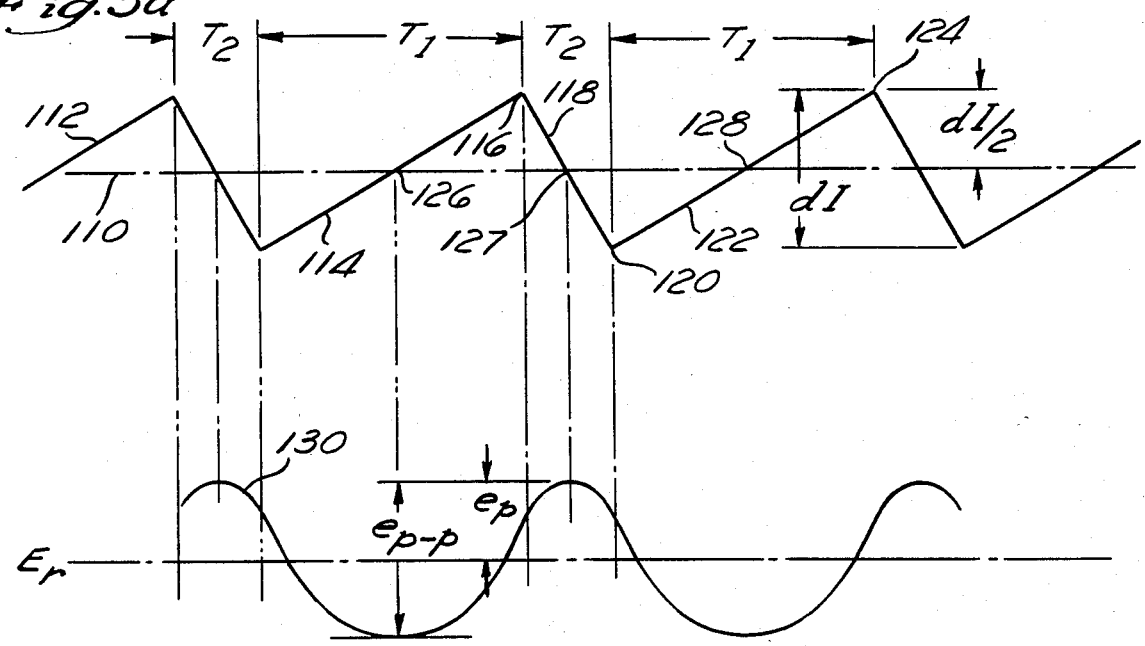
Fig. 5a
Fig. 5b
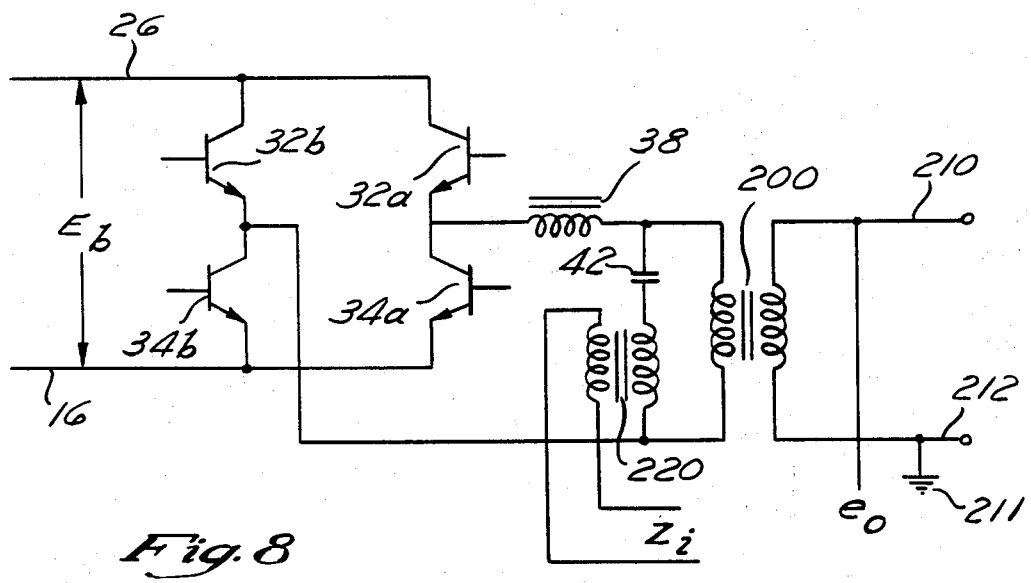
Fig. 8

ANTICIPATORY FEEDBACK TECHNIQUE FOR PULSE WIDTH MODULATED POWER SUPPLY

FIELD OF THE INVENTION

This invention relates generally to power supplies, and, more particularly, to power supplies for generating an output voltage which tracks a reference voltage by using pulse width modulation techniques.

BACKGROUND OF THE INVENTION

Pulse width modulation is a technique that has been developed for AC and DC power supplies. The technique offers improvement over older techniques, such as linear voltage regulators, in size, efficiency and cost.

Pulse width modulation can advantageously be used in DC power supplies and AC inverters or frequency changers. In a common type of DC power supply, using pulse width modulation techniques, one or more semiconductor switches and an inductor are connected in series between a DC source and a DC load. The voltage across the DC load is dependent upon the voltage of the DC source and the relative on time or duty cycle of the semiconductor switches. The duty cycle of the semiconductor switch can be varied to vary the output voltage or to compensate for changes in the input voltage or load current. Typically, the circuit which controls the duty cycle of the semiconductor switch has inputs from the load voltage and from a reference voltage which are continuously compared to maintain the DC output voltage at a substantially constant level. Typically, the semiconductor switches are operated at a frequency of 20 kHz or more.

When an AC output is required, a pulse width modulated inverter is typically used. One simple but useful type of pulse width modulated inverter is called a half bridge. It approximates a sine wave output by switching the voltage source of an inductive element between two DC buses of opposite polarities. Semiconductor switches connecting the inductive element to the two buses are switched at a rate higher than the frequency of the desired output voltage. In a manner similar to a pulse width modulated DC supply, the duty cycle of the switching element determines the relative magnitude of the output voltage with respect to the two DC input buses. In a typical power supply known to the art, the duty cycle of the semiconductor switches vary in accordance with a sinusoidal or other AC reference voltage. Typically, the sinusoidal or other reference voltage is compared with a triangular wave signal having a fixed frequency higher than the frequency of the desired output voltage. The power elements (i.e., the semiconductor switches) are switched at the intersection of the two signals. If the comparison between the reference voltage and the triangular voltage also includes feedback from the output voltage, a closed loop system results which responds to changes in the output voltage caused by variations in the load current. Typically, carrier-modulated pulse width modulated inverters are not well suited for applying a load having large, rapid changes in the load current or in the desired output waveform.

Another type of pulse width modulated inverter has developed known as an optimum-response switching inverter. This type of inverter is illustrated in Electronics Engineers' Handbook, Second Edition, Section 15.33 (1982). As set forth in that reference, the switching rate of the inverter varies throughout the cycle and is determined by the amount of hysteresis which is included in a feedback path from the output voltage to the switching control circuit. Typically, the inverter requires very high switching rates in order to keep the error in the output voltage very small. These types of inverters have the disadvantage that the filter circuit which removes ripple at the switching frequency must be designed to operate over the variations in frequency throughout the AC cycle. Thus, a need exists for a pulse width modulated inverter which responds to rapid variations in the output loading or in the desired output waveform while holding the switching frequency substantially constant under steady state, or near steady state conditions.

SUMMARY OF THE PRESENT INVENTION

The present invention is a pulse width modulated power supply circuit which converts a DC voltage input to an AC or DC voltage output which tracks a fixed or varying reference voltage, such as a sine wave. The device monitors the current through a capacitive filter element, the output voltage, and a reference voltage, and calculates the time at which to switch the semiconductor switching elements of the circuit such that just as the current in the filter capacitor goes through zero, the output voltage will equal the instantaneous reference voltage plus or minus a desired ripple voltage. Thus, the output voltage follows the reference voltage within the limits of the desired ripple voltage.

The ripple voltage is selected according to the desired steady state switching frequency. When the ripple voltage is maintained within calculated limits, the switching frequency remains substantially constant and can therefore be maintained at an optimum compromise between the increased ability to filter out the ripple voltage at higher frequencies and the lower switching losses at lower frequencies.

In one embodiment of the apparatus, a circular equation of the capacitor current as a function of the output voltage is continuously calculated. The switching elements are switched when the equation is satisfied. In another embodiment, a parabolic approximation of the circular equation is substituted and continuously solved, and in a third embodiment, a linear approximation is substituted and continuously solved.

BRIEF DESCRIPTION OF THE DRAWINGS

FIGS. 5a and 5b illustrate the current and voltage waveforms in the filter capacitor of a pulse width modulated inverter such as was illustrated in FIG. 1.

FIG. 8 illustrates a full-bridge alternative to the half bridges of FIGS. 6 and 7.

DETAILED DESCRIPTION OF THE DRAWINGS

Figure 1:
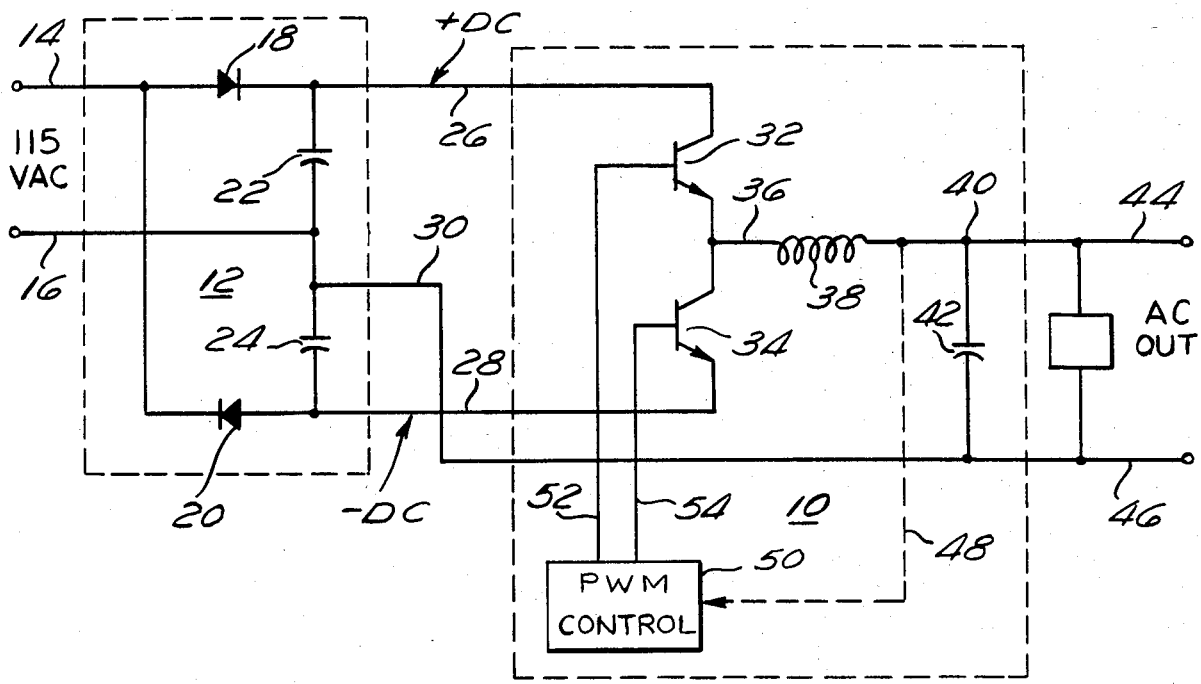
FIG. 1 illustrates a simplified version of a prior art half-bridge pulse width modulated AC power supply.

FIG. 1 illustrates a simplified version of a pulse width modulated inverter circuit 10 for generating an AC or DC typical prior art output voltage from a DC input voltage. In the illustrated circuit, the DC input voltage is provided by a half-wave bridge circuit 12 comprising an AC input line 14, an AC input line 16, a rectifier diode 18, a rectifier diode 20, a filter capacitor 22, and a filter capacitor 24. Typically, the AC input line 14 is connected to the "hot" side of an AC power source and the AC input line 16 is connected to the neutral or ground side. The rectifier diode 18 is connected with its anode to the "hot" line 14 and its cathode to a line 26. The rectifier diode 20 is connected with its cathode to the hot line 14 and its anode to a line 28. The line 26 is connected to one side of the capacitor 22. The other side of the capacitor 22 is connected to the neutral line 16. Similarly, the line 28 is connected to one side of the capacitor 24. The other side of the capacitor 24 is connected to the neutral line 16. As is well known in the art, when an AC voltage is applied between the hot line 14 and the neutral line 16, a positive DC voltage is developed on the line 26, and a negative DC voltage is developed on the line 28. Both voltages are referenced to a line 30 which is electrically connected to the neutral line 16. Typically, the reference line 30 will be referred to as a ground reference, although it is not necessarily connected to the earth ground. One skilled in the art will recognize that the DC voltages on the lines 26 and 28 can be provided by a battery, a full wave rectifier, or other source of DC voltage. The lines 26 and 28 will sometimes be referred to hereinafter as the positive DC bus and the negative DC bus, respectively.

The pulse width modulated power supply circuit 10 comprises a first NPN transistor 32 having its collector connected to the source of positive DC voltage on the line 26, and having its emitter connected to the collector of a second transistor 34. The emitter of the second transistor 34 is connected to the source of negative DC voltage on the line 28. The common connection between the emitter of the transistor 32 and the collector of the transistor 34 is connected via a line 36 to one side of an inductor 38. The other side of the inductor 38 is connected via a line 40 to one side of a capacitor 42 and to an output line 44. The other side of the capacitor 42 is connected to the line 30, and thus to the neutral or ground reference. The line 30 is also connected to a line 46. As will be set forth below, in the particular example shown in FIG. 1, an AC output voltage will be generated across the capacitor 42 and thus between the lines 44 and 46.

The common connection between the inductor 38 and the capacitor 42 on the line 40 can also optionally be connected via a line 48 to a pulse width modulator control circuit 50.

The pulse width modulator circuit 50 has an output on a line 52 which is connected to the base of the transistor 32, and has an output on a line 54 which is connected to the base of the transistor 34. The operation of the pulse width modulator control circuit 50 is well known to the art. Basically, the outputs on the line 52 and the line 54 are controlled such that when the voltage on the line 52 is active to turn on the transistor 32, the voltage on the line 54 is inactive such that the transistor 34 is shut off. Conversely, when the voltage on the line 52 is inactive such that the transistor 32 is shut off, the voltage on the line 54 is active to turn on the transistor 34. This is illustrated more clearly by the waveforms in FIGS. 2a, 2b and 2c.

Figure 2A:
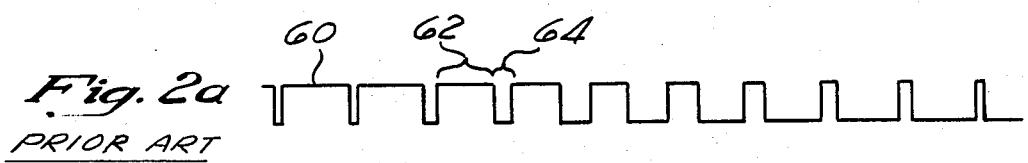
FIGS. 2a, 2b and 2c illustrate the waveforms generated by the half-bridge pulse width modulated AC supply of FIG. 1.
Figure 2B:
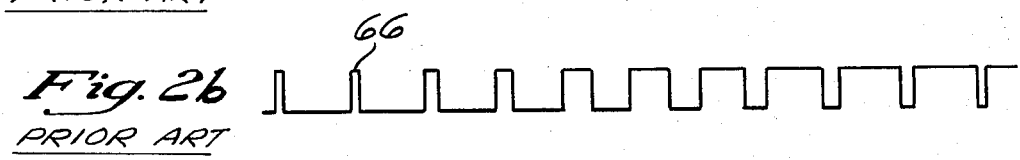

In FIG. 2a, a waveform 60 represents the voltage on the line 52. When the voltage on the line 52 is high, such as is illustrated for the interval 62 in FIG. 2a, the transistor 32 is active and conducts current from the positive DC voltage bus on the line 26 to the line 36 and thus to the inductor 38. When the voltage is low, such as during the interval 64 on the waveform 60, the transistor 32 does not conduct. FIG. 2b illustrates a waveform 66 which represents the voltage on the line 54 connected to the base of the transistor 34. As shown, the waveform 66 is complimentary to the waveform 60. In other words, when the waveform 60 is high, the waveform 66 is low, and vice versa. Thus, during the interval 62, the waveform 66 is low and therefore the transistor 34 is turned off. Similarly, during the interval 64, the voltage on the line 54 is high. Therefore, the transistor 34 is turned on and current is conducted from the line 36 to the negative DC voltage bus on the line 28. Thus, the common connection between the emitter of the transistor 32, the collector of the transistor 34 and the inductor 38 on the line 36 will swing between the positive DC voltage on the line 26 and the negative DC voltage on the line 28 as the transistors 32 and 34 are turned on, respectively. This is illustrated in FIG. 2c by the waveform 68.

Figure 2C:
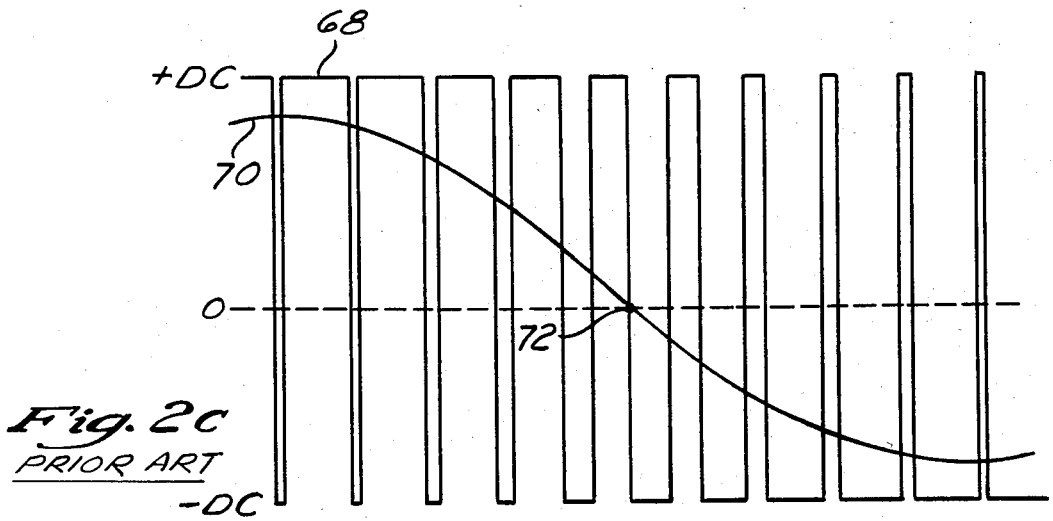

As illustrated in FIG. 2c, the duty cycles of the transistors 32 and 34 are varied such that the amount of time during which the waveform 68 is at the positive DC level and the amount of time during which the waveform 68 is at the negative DC level varies. As is well known in the art, the voltage on the side of the inductor 38 connected to the capacitor 42 will vary in accordance with the relative amount of time that the voltage on the side of the inductor 38 connected to the line 36 spends at each of the DC bus levels. The voltage across the capacitor 42 is illustrated in FIG. 2c by the waveform 70. As shown, the voltage waveform 70 approaches the positive DC level when the waveform 68 spends a proportionally larger amount of time at the positive DC level. Thus, when the voltage represented by the waveform 68 has a duty cycle of approximately 50% at each of the DC levels, such as is illustrated at the location 72, the voltage across the capacitor 42 will be approximately zero volts with respect to the neutral or ground reference on the line 30. Then, as the voltage represented by the waveform 68 spends proportionally greater amount of time at the negative DC level, the voltage across the capacitor 42, represented by the waveform 70, approaches the negative DC level. Thus, by continuously varying the duty cycle of voltages applied to the bases of the transistors 32 and 34 via the lines 52 and 54, respectively, a time varying voltage across the capacitor 42 can be developed. Although illustrated with a sinusoidally varying waveform 70, other DC or time varying waveforms can be generated. One skilled in the art will recognize that the waveform 70 will have a superimposed ripple voltage caused by switching transients.

Figure 3A:
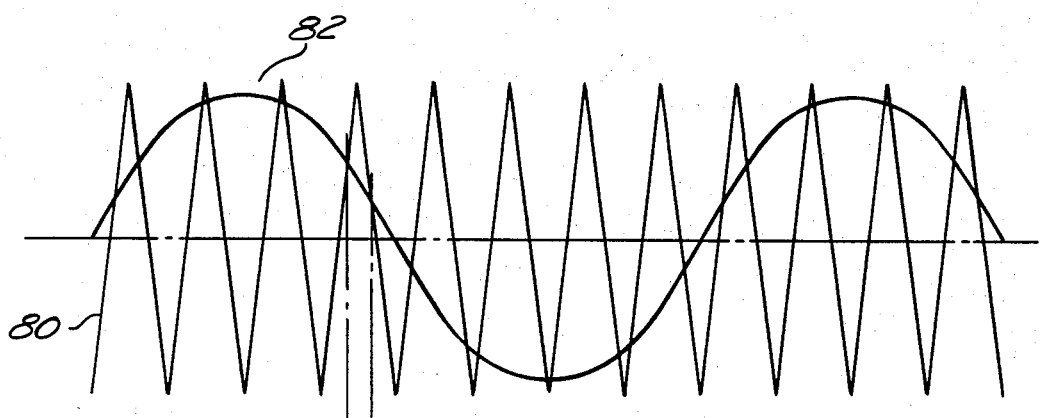
FIGS. 3a and 3b illustrate the relationship between the waveforms of a triangular waveform carrier and a sinusoidal reference and the resulting semiconductor switch control signals.

Typically, the voltages on the lines 52 and 54 are generated by the control circuit 50 by comparing a reference voltage with a linearly varying high frequency voltage, such as a triangle wave. This is illustrated in FIG. 3a, wherein the waveform 80 represents a triangular wave carrier having a frequency equal to the desired switching frequency. Typically, this frequency may be approximately 20 kilohertz, although higher and lower frequencies are commonly used. FIG. 3a also illustrates a waveform 82 which is proportional to the desired output voltage. For example, the waveform 82 may be a 60 hertz sinusoidally varying signal.

Figure 3B:
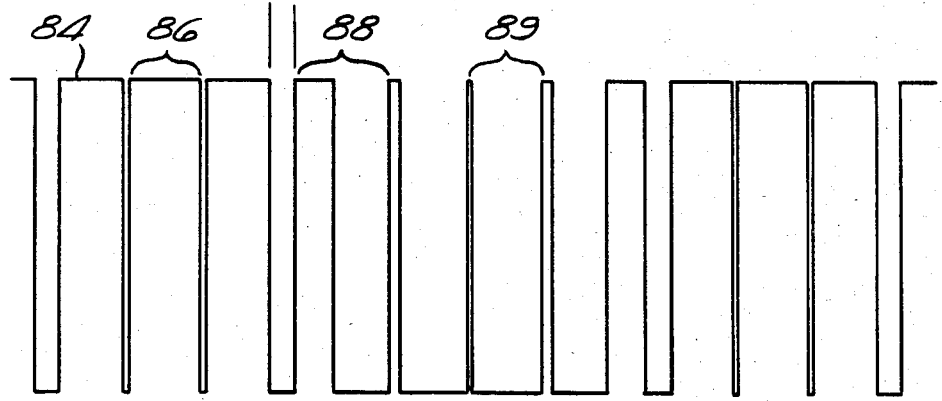
Figure 4:
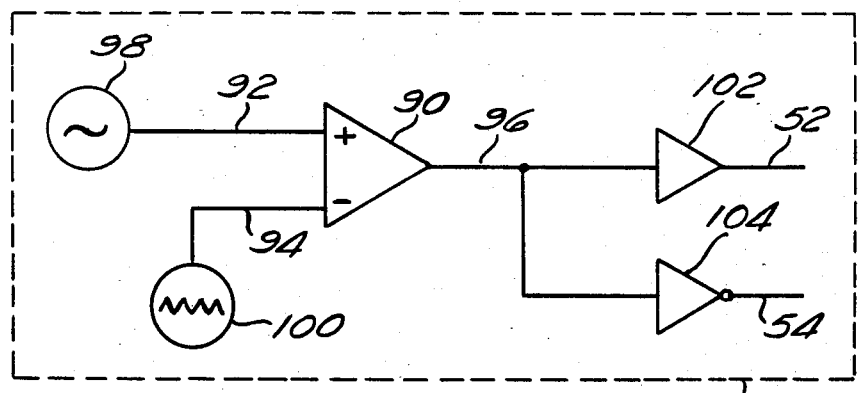
FIG. 4 illustrates a typical prior art control circuit for controlling the semiconductor switches in FIG. 1.

As illustrated in FIG. 4, the control circuit 50 typically includes a comparator 90 having a positive input on a line 92 and a negative input on a line 94 and an output on a line 96. The line 92 is connected to a source 98 of a reference voltage such as the reference voltage 82 in FIG. 3a. Similarly, the line 94 is connected to a triangular wave generator 100 which generates a triangular wave such as the wave 80 in FIG. 3a. The voltage on the output of the comparator 90 on the line 96 will be high when the voltage on the line 92 exceeds the voltage on the line 94, and will be low when the voltage on the line 94 exceeds the voltage on the line 92. This is illustrated by the waveform 84 in FIG. 3b. As can be seen in FIG. 3b, with a high frequency triangular wave, such as the triangular wave 80 in FIG. 3a, and a lower frequency sinusoidal wave, such as the wave 82 in FIG. 3a, the output of the line 96, as illustrated by the waveform 84 in FIG. 3b, will be a waveform with the same frequency as the waveform 80 and having a duty cycle during each period proportional to the amplitude of the reference voltage 82. For example, during the period 86 the waveform 84 spends a proportionally greater amount of time at a high level because the reference voltage 82 is more positive than the triangle wave 80 for a large portion of the period. During the period 88, the duty cycle of the waveform 84 is approximately 50%–50% representing a reference waveform 82 having approximately the same average voltage as the triangle waveform 80. During the period 89, the waveform 84 has a relatively low positive duty cycle since the reference waveform 82 is lower than the triangle waveform 80 for most of the period.

Returning to FIG. 4, the line 96 is connected to a drive circuit 102 and to a drive circuit 104. The drive circuit 102 generates a voltage on the line 52, which corresponds to the line 52 in FIG. 1, which is sufficiently high to drive the base of the transistor 32 when the voltage on the line 96 is high. Similarly, the driver 104 generates a voltage on the line 54 which will drive the base of the transistor 34 in FIG. 1 when the voltage on the line 96 in FIG. 4 is low. Thus, the voltages on the lines 52 and 54 will be similar to the voltages illustrated in FIGS. 2a and 2b, respectively. Of course, in an actual circuit, the frequency of the triangle waveform 80 will be much higher relative to the sinusoidal reference waveform 82 that is illustrated in FIG. 3a. For example, the triangle waveform 80 may have a frequency of 20,000 hertz while the reference waveform 82 may have a frequency of 60 hertz.

Although the pulse width modulated inverter circuit described above in connection with FIGS. 1–4 is adequate to provide an AC output which follows the reference voltage, it typically is useful only for a relative constant load connected across the capacitor 42 and for low frequency outputs. If the load varies rapidly, the voltage across the capacitor 42 can become distorted due to the impedance of the inductor 38. Thus, in a typical prior art device, the line 48, shown in FIG. 1, is connected to the lines 40 and 44 and to the control circuit 50 to provide feedback information. Typically, the voltage on the line 48 is compared with the AC reference voltage to generate an error signal which varies the duty cycle of the voltages generated on the lines 52 and 54. However, in typical devices, the feedback is not adequate to prevent distortion in the output voltage caused by rapid changes in the load because of phase shifts in the filter which tend to cause feedback loop oscillation. Thus, a need exists for an apparatus which can anticipate the need to change the duty cycle to compensate for changes in the load current or desired output voltage.

Figure 6:
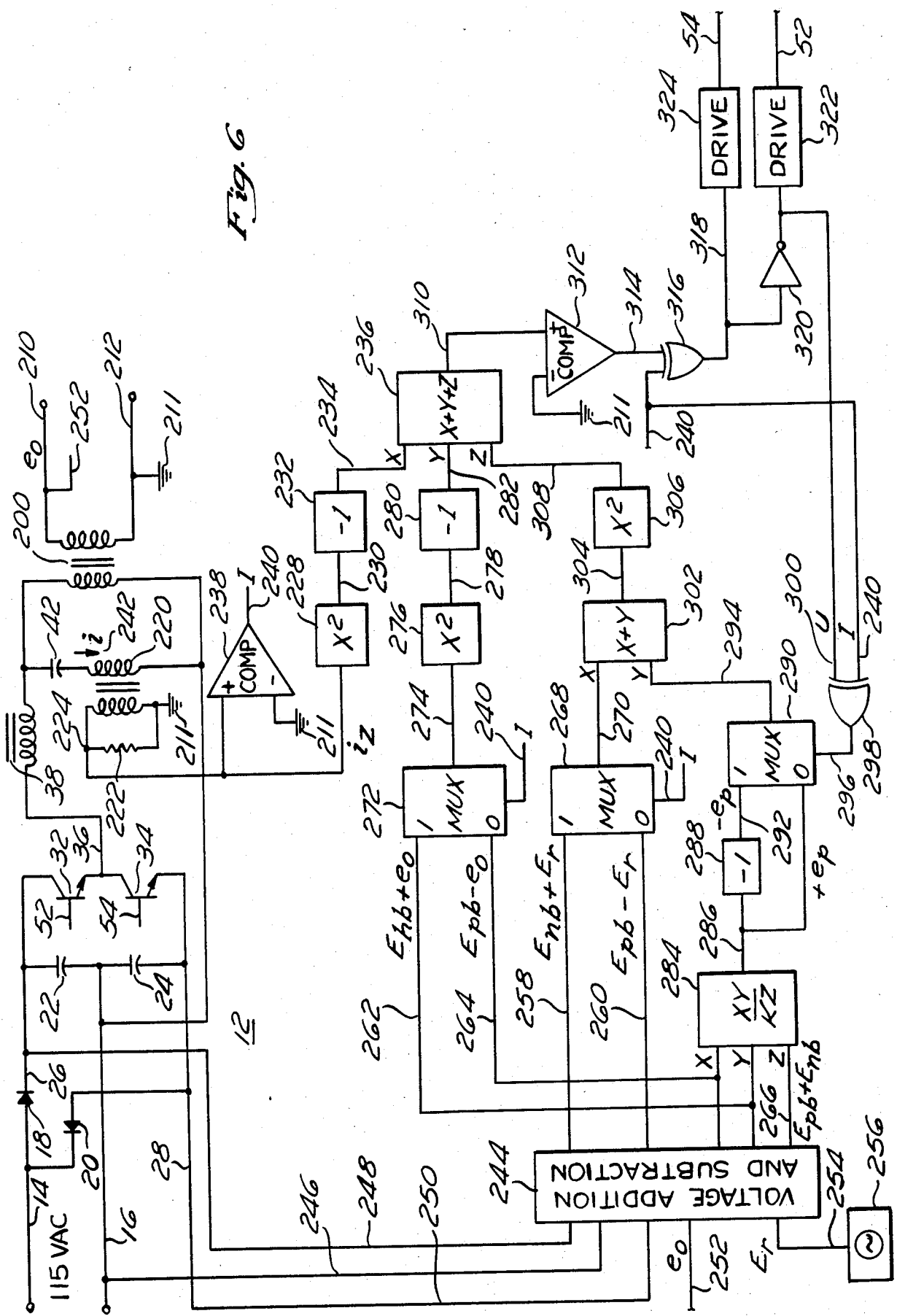
FIG. 6 illustrates a preferred embodiment of the present invention.
Figure 7:
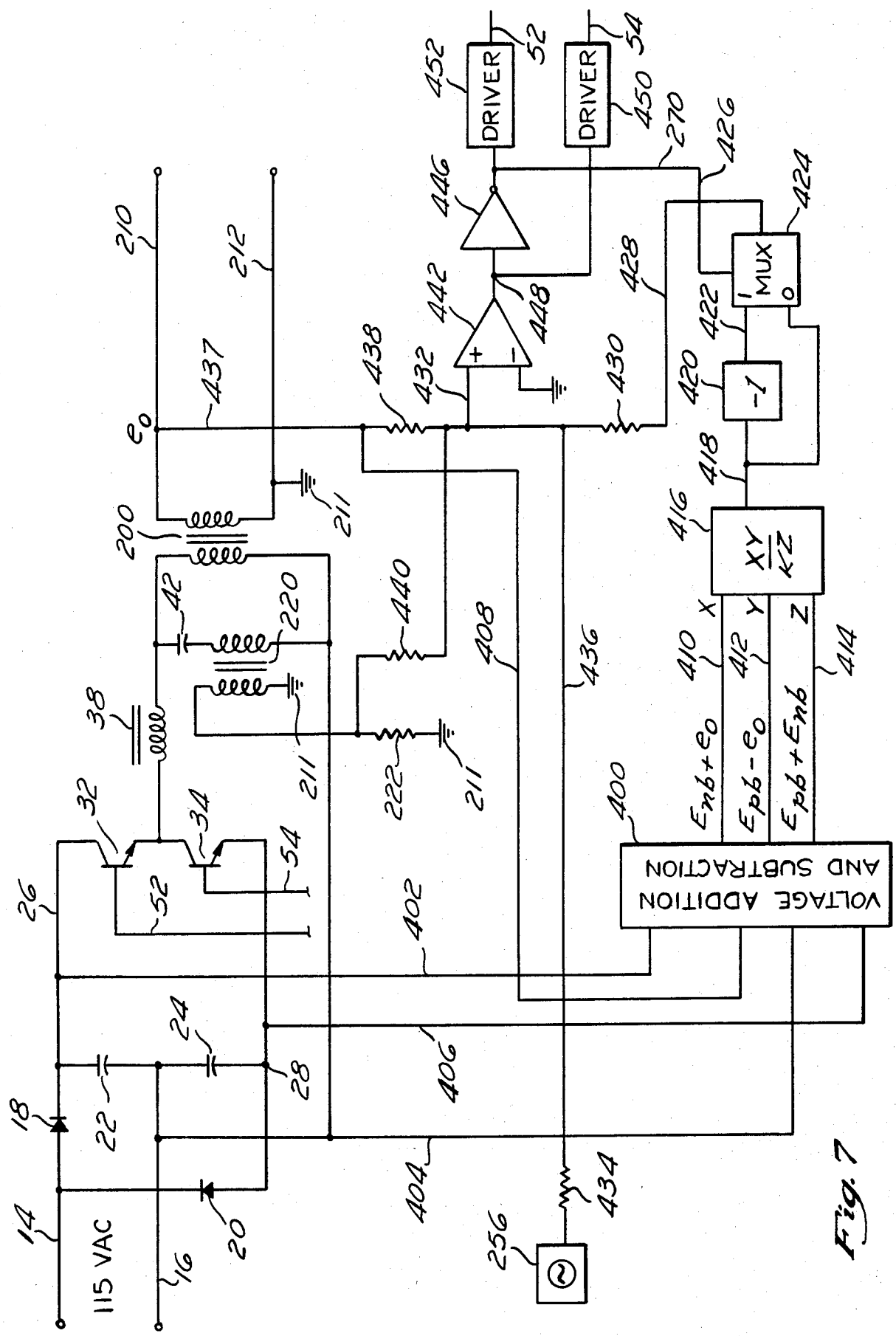
FIG. 7 illustrates an alternative embodiment of the present invention using a linear approximation for the current in the control circuit.

The present invention overcomes the deficiencies of the prior art by providing a pulse width modulated inverter having optimum feedback to increase the bandwidth of the feedback loop while maintaining the pulse width frequency constant under steady state or near steady state conditions. Three alternative embodiments of the present invention are illustrated in FIGS. 6, 7, and 8. However, before describing the structures of the embodiments, a mathematical background for the devices will be set forth.

FIG. 5a illustrates the current through a filter capacitor of a pulse width modulated inverter circuit such as was previously illustrated as capacitor 42 in FIG. 1 under steady state or near steady state condition. A phantom line 110 represents the average current through the filter capacitor 42. A solid line 112 represents a typical waveform representative of the current through the capacitor when the output voltage on the line 40 (i.e., at the common connection between the inductor 38 and the capacitor 42) is nearer the positive DC voltage on line 26 than to the negative DC voltage on the line 28. Since the ripple in the voltage is assumed to be small relative to the input DC voltages, a relatively small error results in calculating the current if it is assumed that the output voltage does not change during a cycle of the switching frequency, resulting in straight line segments for 112 in FIG. 5a. As illustrated, during the time interval $T_1$ the current through the capacitor 42 is increasing along a segment 114 of the waveform 112. This occurs when the transistor 32 is active. At location 116 on the waveform 112, the slope of the current changes and decreases along a segment 118 of the waveform 112 to a location 120. This corresponds to the time when the transistor 32 is turned off and the transistor 34 is turned on. The time from the location 116 to the location 120 along the segment 118 is designated as $T_2$. When the current reaches the location 120, the transistor 34 is turned off and the transistor 32 is turned on. The slope changes and the current again increases along a segment 122 to a location 124, again for a duration $T_1$. The change in current during the time $T_1$ or $T_2$ is equal to the peak-to-peak pulse width modulation frequency component of the current in the inductor 38. The peak-to-peak amplitude of the current change is designated as dI. During the period $T_1$, from location 120 to location 124 along the current waveform, the transistor 34 is shut off and the transistor 32 conducts to return the voltage level on the line 36 to the positive DC potential. The current increases by the amount dI. Thus, the current varies around the average level by plus-or-minus dI/2. As clearly shown, the slope of the current waveform during the periods $T_1$ when the transistor 32 is conducting are less than the slopes during the times $T_2$ when the transistor 34 is conducting. This occurs because the differential voltage causing the current change is greater when the transistor 34 is conducting than when the transistor 32 is conducting. If a current waveform was drawn for the corresponding negative output voltage, i.e., when the voltage on the line 40 is closer to the negative bus on the line 28, the slopes would be reversed. Similarly, if the output voltage is at or near the neutral or ground reference on the line 30, the current waveforms would be substantially symmetrical, with approximately the same positive slope during the period $T_1$ as the negative slope during the period $T_2$. Furthermore, in the latter instance, the periods $T_1$ and $T_2$ would be substantially the same.

During the time from the location 116 to the location 127 on the segment 118, the current on the inductor 38 is flowing in a positive direction. However, the transistor 34 is turned on to cause the current to flow through the inductor 38 in the opposite direction. Since the current through the inductor 38 cannot be forced to change instantaneously the transistor 34 includes an antiparallel or free-wheeling diode (not shown) with its anode connected to the emitter of the transistor 34 and the cathode connected to the collector of the transistor 34. The diode (not shown) thus will conduct the current flowing through the inductor 38 until the current changes its polarity at the location 127. Similarly, the transistor 32 includes an anti-parallel or free-wheeling diode (not shown) connected in the same manner between the emitter and the collector of the transistor 32 to conduct current during the interval from location 120 to location 128. Although, the diodes (not shown) can be discrete diodes, in the preferred embodiments, the diodes are incorporated into the transistors 32 and 34. The EVK 31-050 Dual Darlington transistor manufactured by Fuji is advantageously used to provide both transistors 32 and 34 and the anti-parallel diodes (not shown) in one package.

Continuing to refer to FIG. 5a, the change in the current through the inductor 38 and thus through the capacitor 42 during each of the conducting periods can be represented by the following equations:

$$E_{pb} - e_o = \frac{LdI}{T_1} \quad (1)$$

$$E_{nb} + e_o = \frac{LdI}{T_2} \quad (2)$$

where $E_{pb}$ is the magnitude of the positive voltage on the line 26; $E_{nb}$ is the magnitude of the negative voltage on the line 28; $e_o$ is the output voltage on the lines 40 and 41; L is the inductance of the inductor 38; and $T_1$, $T_2$ and dI are as shown in FIG. 5.

Equations 1 and 2 above follow from the fact that the rate of change of the current through the inductor 38 depends upon the voltage differential across the inductor. It should be noted that $E_{nb}$ in the Equation 2 is a positive value equal to the magnitude of the voltage on the line 28. Thus, the left-hand side of the Equation 2 becomes smaller as the output voltage becomes more negative. Similarly, the left-hand side of the Equation 1 becomes smaller as the output voltage becomes more positive.

Since the period of the current waveform in FIG. 5 is equal to the inverse of the frequency (i.e., 1/f), then $T_1$ plus $T_2$ must equal 1/f. Equations 1 and 2 can be rewritten as follows:

$$T_1 = \frac{LdI}{(E_{pb} - e_o)} \quad (3)$$

$$T_2 = \frac{LdI}{E_{nb} + e_o} \quad (4)$$

Therefore:

$$1/f = T_1 + T_2 = LdI\left[\frac{1}{(E_{nb} + e_o)} + \frac{1}{(E_{pb} - e_o)}\right] \quad (5)$$

$$1/f = LdI\left[\frac{(E_{pb} + E_{nb})}{(E_{nb} + e_o)(E_{pb} - e_o)}\right] \quad (6)$$

$$dI = \frac{(E_{nb} + e_o)(E_{pb} - e_o)}{fL(E_{pb} + E_{nb})} \quad (7)$$

FIG. 5b illustrates a voltage waveform 130 which corresponds to the component of voltage in the capacitor 42 caused by the ripple current waveform illustrated in FIG. 5a. The voltage 130 varies around a reference voltage $E_r$ shown as a phantom line. When the current waveform 112 in FIG. 5a is greater than the average current, the voltage represented by the waveform 130 in FIG. 5b increases. Conversely, when the current waveform 112 in FIG. 5a is less than the average current 110, the voltage waveform 130 decreases. The voltage represented by the waveform 130 is at its minimum value when the current waveform 112 crosses the average current 110 at a location 126. The voltage waveform 130 increases parabolically as the current increases to the location 116. At that location, the slope of the current changes and the current begins to decrease. Thus, the voltage waveform 130 begins to increase at a slower and slower rate until the current waveform 112 crosses the average current 110 at a location 127. Then the voltage waveform begins to decrease at an increasing rate until the current reaches its minimum value at the location 120. The voltage waveform then begins to decrease at a slower and slower rate as the current begins to increase along the waveform segment 122. When the current waveform crosses the average current 110 at the location 128, the voltage waveform then begins to increase again. The segments of FIG. 5b are represented here as segments of parabolas. If the assumption that the voltage does not change when calculating these currents were removed, segments of sinusoidal waveforms would result, but for small time periods, the parabolic representations are substantially identical to the actual sinusoidal waveforms.

Now, referring to FIG. 5b, the peak-to-peak ripple voltage on the capacitor 42 of FIG. 1 is equal to Q/C where Q is the change of charge and C is the capacitance of the capacitor 42. Since Q is equal to the area underneath the current waveform, the peak-to-peak voltage, $e_{p-p}$, can be determined by evaluating the area of the current waveform in FIG. 5a above the average current value 110. Since the area of a triangle is equal to one-half of the base times the height, and since the height is equal to dI/2, and the base is equal to $T_1$ plus $T_2$ divided by 2 (i.e., 1/(2f)), the peak-to-peak ripple voltage can be found as follows:

$$e_{p-p} = \frac{1}{2}\left[\frac{1}{2f}\right]\left[\frac{dI}{2C}\right] = \frac{dI}{8fC} \quad (8)$$

Substituting the Equation 7 for dI in the Equation 8, we have:

$$e_{p-p} = \frac{(E_{nb} + e_o)(E_{pb} - e_o)}{8f^2 LC(E_{pb} + E_{nb})} \quad (9)$$

Equation 9, above, calculates the peak-to-peak ripple voltage as shown in FIG. 5b. The peak ripple voltage, as used herein, corresponds to one-half the peak-to-peak ripple voltage and is calculated according to the following equation:

$$e_p = \tfrac{1}{2}e_{p-p} = \frac{(E_{nb} + e_o)(E_{pb} - e_o)}{16f^2 LC(E_{pb} + E_{nb})} \quad (10)$$

The object of the present invention is to calculate the above Equation 10 and adjust the time when the transistor 32 is turned off and the transistor 34 is turned on, and vice versa, in such a way as to generate the above peak ripple voltage, $e_p$. If the ripple voltage is adjusted to be correct, the correct selected constant switching (i.e., ripple) frequency, f, will result. Thus, the output filter circuits can be adjusted to match the selected ripple frequency and will provide optimum filtering of the components in the output voltage due to the switching currents.

The invention comprises an apparatus to calculate the time at which to switch one of the transistors off and the other one on such that when the ripple current through the capacitor goes through zero, the output voltage will equal the instantaneous reference voltage plus or minus the ripple voltage from the Equation 10, above. This can be illustrated in connection with FIGS. 5a and 5b. For instance, at location 116 of the current waveform 112 in FIG. 5a, transistor 32 is switched off and transistor 34 is switched on to reverse the voltage across the inductor 38. As illustrated in FIG. 5b, the voltage waveform 130 corresponding to the ripple voltage on the capacitor 42 continues to rise until the ripple current goes to zero (i.e., the current is equal to the average current 110 through the capacitor). At that time, the output voltage, $e_o$, should be equal to the reference voltage plus the ripple voltage, $e_p$, from the Equation 10.

During the period $T_2$ when transistor 34 is turned on the current through the indicator 38 is as follows:

$$E_{nb} + e_o = -L\frac{di}{dt} \quad (11)$$

and the current through capacitor 42 is $$i = C\frac{de_o}{dt} \quad (12)$$

If the load current is constant, the currents in the Equation 11 and the Equation 12 are equal. Thus, it follows that:

$$E_{nb} + e_o = -L\frac{di}{de_o}\frac{de_o}{dt} = \frac{-L}{C}i\frac{di}{de_o} \quad (13)$$

Separating variables and integrating, it then follows that:

$$2E_{nb}e_o + e_o^2 = -(Zi)^2 + K \quad (14)$$

where $Z = \sqrt{L/C}$ and K is the constant of integration. If $e_o$ is to be $E_r + e_p$ (the reference or desired output voltage) at the moment when $i = 0$, then $$K = 2E_{nb}(E_r + e_p) + (E_r + e_p)^2 \quad (15)$$

Substituting this value in the Equation 14 and adding $E_{nb}^2$ to both sides gives:

$$e_o^2 + 2E_{nb}e_o + E_{nb}^2 = -(iZ)^2 + (E_r + e_p)^2 + (E_r + e_p)^2 + 2E_{nb}(E_r + e_p) + E_{nb} \quad (16)$$

Factoring and moving $(iZ)^2$ to the left side gives:

$$(E_{nb} + e_o)^2 + (iZ)^2 = (E_{nb} + E_r + e_p)^2 \quad (17)$$

Equation 17 describes both the relationship between i and $e_o$ after turning on transistor 34 and the boundary between the regions where transistors 32 and 34 are to be turned on. If the left side of the Equation 17 is less than the right side, or if $$(E_{nb} + e_o)^2 + (iZ)^2 < (E_{nb} + E_r + e_p)^2 \quad (18)$$

then the transistor 32 should be on. The transistor 34 will be turned on just as the Equation 17 is satisfied. If for some reason, for example, some initial or transient condition should occur, and the inequality of the Equation 18 is reversed, the transistor 34 should go on.

So that the circuit cannot be put into a condition where neither the transistor 32 nor the transistor 34 is on, another equation is defined in the region of $i < 0$ which matches the Equation 18 at $e_o = E_r + e_p$, or where i crosses zero. The equation is:

$$(E_{pb} - e_o)^2 + (iZ)^2 > (E_{pb} - E_r - e_p)^2 \quad (19)$$

During the period $T_1$ when the transistor 32 is on, a similar condition to the Equation 17 can be derived for the transistor 32 to be on:

$$(E_{pb} - e_o)^2 + (iZ)^2 = (E_{pb} - E_r + e_p)^2 \quad (20)$$

The region where the transistor 32 is to be on is $$(E_{pb} - e_o)^2 + (iZ)^2 > (E_{pb} - E_r + e_p)^2 \quad (21)$$

This will normally occur when $i < 0$. The condition chosen to match it when $i > 0$ is:

$$(E_{nb} + e_o)^2 + (iZ)^2 < (E_{nb} + E_r - e_p)^2 \quad (22)$$

The choice of the Equations 19 and 22 is for convenience since the Equation 19 does not intersect the Equation 21, and the Equation 18 does not intersect the Equation 22. Other equations could be chosen since these conditions are not met in normal operation.

An apparatus constructed to solve the foregoing equations will generate an output voltage having a ripple voltage with a waveform such as that shown in FIG. 5b. Unlike pulse width modulated supplies which switch when the output voltage exceeds or overshoots the reference voltage plus or minus the ripple voltage, an apparatus constructed according to the foregoing equations anticipates the maximum allowed ripple voltage and switches the power transistors prior to reaching that voltage. Thus, overshoots of the maximum allowable ripple voltage are substantially reduced. Furthermore, since the magnitude of the ripple voltage is a function of the magnitude of the reference voltage, the voltage at which the power transistors are switched varies so that the switching frequency can be maintained at a substantially constant frequency in the presence of steady-state or near steady-state conditions on the load or on the reference voltage.

The preferred embodiment of the apparatus of the present invention is illustrated in FIG. 6. The apparatus includes a DC power source 12 such as was illustrated in connection with FIG. 1, wherein like components have like numerical designators. The transistors 32 and 34 perform the same function as before and are driven by the lines 52 and 54, respectively. A voltage is developed across the capacitor 42, as before. However, in this embodiment, the voltage developed across the capacitor 42 is transformer coupled via a transformer 200 to develop a voltage $e_o$ on a line 210 connected to one side of the output of the transformer 200. The other side of the output of the transformer 200 is connected to an output ground reference 211 and to a line 212. Preferably, the output ground reference 211 is not connected to the input power common. A load (not shown) is connected to the lines 210 and 212. The output ground reference need not be connected to earth ground.

The current through the capacitor 42 passes through the primary winding of a current transformer 220 and back to the input power common 16. One side of the secondary winding of the current transformer 220 is connected to the output ground reference 211. The other side of the secondary winding of the current transformer 220 is connected to a resistor 222. The other side of the resistor 222 is connected to the output ground reference 211. The common connection between the secondary winding of the transformer 220 and the resistor 222 is designated as a node 224. A voltage is developed across the resistor 222 and thus on the node 224 which is proportional to the current through the primary winding of the transformer 220 and thus proportional to the current through the capacitor 42. This voltage is connected to an analog squaring circuit 228 which generates an output voltage proportional to the square of the input voltage. Since the voltage on the node 224 is proportional to the current through the filter capacitor 42, which is a function of the inductance of the inductor 38 and the capacitance of the capacitor 42, the input to the analog squaring circuit 228 will be proportional to iZ. The value of the resistance 222 is advantageously selected such that the magnitude of the voltage on the node 224 is properly scaled. The output of the analog squaring circuit 228 will thus be $(iZ)^2$ on a line 230. The line 230 is connected to the input of an analog inverter 232 which generates an output on a line 234 which is equal to $-(iZ)^2$. The line 234 is connected to one input of an analog summing circuit 236.

The voltage on the node 224 (i.e., iZ) is also connected to the positive input of a comparator 238. The negative input of the comparator 238 is connected to the output ground reference 211. The output of the comparator 238 on a line 240 will therefore be high, or active, when the voltage on the node 224 is positive, and will be low, or inactive, when the voltage on the node 224 is negative. Since the polarity of the voltage on the node 224 is determined by the direction of the current flow through the transformer 220, the voltage on the line 240 will be high, or active, when the current flow is in the direction of an arrow 242 (i.e., during the time from the location 126 to the location 127 in FIG. 5a).

The voltage on the line 240 will be low, or inactive, when the current through the capacitor 42 is flowing in the direction opposite the arrow 242 (i.e., during the time from the location 127 to the location 128 in FIG. 5a). The voltage on the line 240 controls the operation of analog multiplexers and logic gates, as will be set forth below.

A voltage addition and subtraction circuit 244 is provided which generates outputs proportional to arithmetic sums and differences of its inputs. A line 246 connects one input of the voltage addition and subtraction circuit 244 to the input power common 16. A line 248 connects another input of the circuit 244 to the positive DC voltage bus on the line 26, and a line 250 connects the negative DC voltage bus on the line 28 to another input to the circuit 244. The circuit 244 has another input on a line 252 which is connected to the output voltage, $e_o$, on the line 210. The circuit 244 also has an input on a line 254 which is connected to the output of a voltage reference source 256. The voltage on the line 254 is designated as $E_r$ and corresponds to $E_r$ in the above-described equations.

The voltage addition and subtraction circuit 244 has an output on a line 258 which is proportional to the negative DC bus voltage $E_{nb}$ plus the reference voltage, $E_r$ (i.e., $E_{nb}+E_r$). The circuit 244 also has an output on a line 260 which is proportional to $E_{pb}-E_r$. The circuit 244 has an output on a line 262 proportional to $E_{nb}+e_o$, and an output on a line 265 proportional $E_{pb}-e_o$. The circuit 244 has an output on a line 266 proportional to $E_{pb}+E_{nb}$. One skilled in the art will appreciate that the voltage addition and subtraction circuit 244 comprises differential amplifiers and resistance networks to generate the foregoing output voltages as functions of the input voltages and that the magnitudes of the resistances and the gains of the amplifiers are selected to scale the output voltages to be proportional to the desired function of the input voltages.

The voltages on the lines 258 and 260 are provided as the two inputs to an analog multiplexer 268 which is controlled by the voltage on the line 240. When the voltage on the line 240 is high, the output of the analog multiplexer 268 on a line 270 will be substantially the same as the voltage on the line 258 (i.e., $E_{nb}+E_r$). If the voltage on the line 240 is low, the output of the multiplexer 268 on the line 270 will be substantially the same as the voltage on the line 260 (i.e., $E_{pb}-E_r$).

The lines 262 and 264 are provided as the two inputs to an analog multiplexer 272. The analog multiplexer 272 is also controlled by the voltage on the line 240 and provides an output voltage on a line 274 which is substantially equal to the input voltage on the line 262 (i.e., $E_{nb}+e_o$) when the voltage on the line 240 is high. The output of the multiplexer 272 on the line 274 will be substantially equal to the voltage on the line 264 (i.e., $E_{pb}-e_o$) when the voltage on the line 240 is low.

The line 274 is provided as an input to an analog squaring circuit 276 which provides an output on a line 278 which is substantially equal to the square of the input voltage on the line 274. In other words, the voltage on the line 278 will be either $(E_{nb}+e_o)^2$ or $(E_{pb}-e_o)^2$, depending upon the voltage on the line 240. The voltage on the line 278 is provided as an input to an analog inverting circuit 280 which provides an output voltage on line 282 which has the opposite polarity of the voltage on the input line 278. The line 282 is provided as a second input to the analog summing circuit 236.

The lines 262 and 264 are also provided as inputs to an analog multiplication/division circiut 284. The voltage on the line 266 is also provided as a third input to the circut 284. The output of the circuit 284 on a line 286 is proportional to the product of the inputs on the lines 262 and 264 divided by the input on the line 266. In other words, the output of the circuit 284 on the line 286 is proportional to the Equation 10, repeated below:

$$e_p = \tfrac{1}{2}e_{p-p} = \frac{(E_{nb} + e_o)(E_{pb} - e_o)}{16f^2LC(E_{pb} + E_{nb})} \quad (10)$$

The magnitudes of the components in the voltage addition and subtraction circuit 244 are chosen such that the proportionality constant (i.e., $(1/16f^2LC(E_{pb}+E_{nb}))$) is satisfied. Thus, the voltage on the line 286 will be proportional to the ripple voltage, $e_p$.

The voltage on the line 286 is provided as an input to an analog inverter circuit 288 and as one input to an analog multiplexer 290. The output of the analog inverter 288 on a line 292 is provided as a second input to the analog multiplexer 290. This input is proportional to $-e_p$. The output of the analog multiplexer 290 on a line 294 is either $+e_p$ or $-e_p$ depending upon a control voltage on a line 296. The line 296 is connected to the output of an exclusive-OR gate 298. One input to the exclusive-OR gate 298 is the control voltage on the line 240. The other input to the exclusive-OR gate 298 is a control voltage on a line 300 which is active high when the upper transistor 32 is conducting and active low when the lower transistor 34 is conducting. The voltage on the line 296 will be high when the control voltages on the line 240 and the line 300 are different and will be low when the control voltages on the line 240 and the line 300 are the same.

The voltage on the line 294 and the voltage on the line 270 are provided as inputs to an analog summing circuit 302. The output of the analog summing circuit 302 is provided via a line 304 to an analog squaring circuit 306 which provides an output voltage on a line 308 which is proportional to the square of the input voltage on the line 304. The voltage on the line 308 will be one of four voltages, depending upon the state of the control voltages on the line 240 and the line 300. When the control voltage on the line 240 is high and the control voltage on the line 300 is high, the control voltage on the line 296 is low, and the voltage on the line 294 is $+e_p$. Furthermore, the voltage on the line 270 is $E_{nb}+E_r$. Therefore, the voltage on the line 304 is $E_{nb}+E_r+e_p$, and the voltage on the line 308 is $(E_{nb}+E_r+e_p)^2$. Thus, the voltage on the line 308 will be proportional to the right-hand side of the Equation 18.

If the control voltage on the line 300 is low and the control voltage on the line 240 is high, the control voltage on the line 296 will be high, and the output of the multiplexer 290 on the line 294 will be $-e_p$. Therefore, the voltage on the line 308 will be $(E_{nb}+E_r-e_p)^2$. Under these conditions, the voltage on the line 308 will be proportional to the right-hand side of the Equation 22.

When the control voltage on the line 300 is high and the control voltage on the line 240 is low, the control voltage on the line 296 is high and the output of the multiplexer 290 on the line 294 is $-e_p$. In this case, the output of the multiplexer 268 on the line 270 is $E_{pb}-E_r$. The voltage on the line 308 will therefore be $(E_{pb}-E_r-e_p)^2$. The voltage on the line 308 will therefore be proportional to the right-hand side of the Equation 19.

When the control voltage on the line 300 and the control voltage on the line 240 are both low, the control voltage on the line 296 will be low, and the output of the multiplexer 290 on the line 294 will be $+e_p$. The output of the multiplexer 268 on the line 270 will be $E_{pb}-E_r$. The voltage on the line 308 will therefore be $(E_{pb}-E_r+e_p)^2$. Therefore, the voltage on the line 308 will satisfy the right-hand side of the Equation 21.

For convenience, the foregoing can be summarized by the following table:

TABLE I

| Line 240 | Line 300 | Line 308 |
|---|---|---|
| Low | Low | $(E_{pb}-E_r+e_p)^2$ |
| Low | High | $(E_{pb}-E_r-e_p)^2$ |
| High | Low | $(E_{nb}+E_r-e_p)^2$ |
| High | High | $(E_{nb}+E_r+e_p)^2$ |

The output of the analog addition circuit 236 is provided on a line 310 and is connected to the positive input of a comparator 312. The negative input to the comparator 312 is connected to the output ground reference 211. The voltage on the line 310 will be positive when the sum of the inputs to the addition circuit 236 is positive and will be negative when the sum of the inputs to the circuit 236 is negative. As set forth above, the inputs to the circuit 236 are determined by the states of the control voltages on the line 240 and the line 300, which have been described above and which can be summarized by the following table:

TABLE II

| Line 240 | Line 300 | Line 310 |
|---|---|---|
| Low | Low | $(E_{pb}-E_r+e_p)^2-(E_{pb}-e_o)^2-(iZ)^2$ |
| Low | High | $(E_{pb}-E_r-e_p)^2-(E_{pb}-e_o)^2-(iZ)^2$ |
| High | Low | $(E_{nb}+E_r-e_p)^2-(E_{nb}+e_o)^2-(iZ)^2$ |
| High | High | $(E_{nb}+E_r+e_p)^2-(E_{nb}+e_o)^2-(iZ)^2$ |

The output of the comparator 312 on a line 314 is connected to one input of an exclusive-OR gate 316. The other input to the exclusive-OR gate 316 is connected to the control voltage on the line 240. The output of the exclusive-OR gate 316 on a line 318 is connected to an inverter 320. The output of the inverter 320 is the control voltage on the line 300. The output of the inverter 320 is also connected to a drive circuit 322. The output of the drive circuit 322 is provided on the line 52 to drive the base of the transistor 32. The drive circuit 322 is advantageously constructed such that a common ground reference is not required between the transistor 32 and the inverter 320. For example, in the preferred embodiment, the drive circuit 322 provides transformer coupling from the output of the inverter 320 to the base of the transistor 32. The line 318 is also connected to a drive circuit 324. The output of the drive circuit 324 is provided to the line 54 to drive the base of the transistor 34. In a manner similar to the drive circuit 322, the drive circuit 324 provides transformer coupling from the line 318 to the transistor 34 to provide AC isolation between the input power and the output circuitry.

The operation of the preferred embodiment of the present invention illustrated in FIG. 6 can be summarized in accordance with the above-described tables by referring to FIGS. 5a and 5b. Starting at the location 126 in FIG. 5a, the current i is positive and the upper transistor 32 is on. Therefore, the control voltage on the line 240 is enabled or high and the control voltage on the line 300 is also high. According to the Table II, the voltage on the line 310 on the output of the analog adder 236 will be:

$$(E_{nb}+E_r+e_p)^2-(E_{nb}+e_o)^2-(iZ)^2$$

As long as $(E_{nb}+E_r+e_p)^2$ is greater than $(E_{nb}+e_o)^2+(iZ)^2$, then the voltage on the line 310 is positive and the Equation 18 is satisfied. A positive voltage on the line 310 causes the output of the comparator 316 on the line 314 to be high. The exclusive-OR gate 316 has two high inputs; thus, the output of the exclusive-OR gate 316 on the line 38 will be low, and the input to the driver 324 will be low. The inverter 320 causes the input to the driver 322 on the line 300 to be high. Thus, the transistor 32 will be on and the transistor 34 will be off.

Since the current i and the output voltage $e_o$ are increasing, the left-hand side of Equation 18 will become larger than the right-hand side at the location 116 on the FIG. 5a, and the output of the analog adder 236 will go negative. The output of the comparator 312 will become low. Since the current is still positive the exclusive-OR gate 316 will have one high input and one low input and the output on the line 318 will become high, causing the transistor 32 to switch off and the transistor 34 to switch on. The control voltage on the line 300 also becomes low, causing the output of the exclusive-OR gate 298 to switch states to a logic one or high condition. The multiplexer 290 will transmit the $-e_p$ signal to the line 294. Thus, the output of the analog adder 236 will become:

$$(E_{nb}+E_r-e_p)^2-(E_{nb}+e_o)^2-(iZ)^2$$

Thus, the circuit in FIG. 6 begins solving the Equation 22. Since the left-hand side of the Equation 22 is initially greater than the right-hand side, the inequality is not satisfied. The output of the analog adder 236 remains negative, the transistor 34 remains on, and the transistor 32 remains off.

Before the left-hand side of the Equation 22 becomes less than the right-hand side, the current i passes through zero and becomes negative at the location 127 on the FIG. 5a. Therefore, the control voltage on the line 240 switches from the high logic state to the low logic state. With both the control voltage on the line 240 low and the control voltage on the line 300 low, according to the foregoing Table I and Table II, the output of the analog adder circuit 236 becomes:

$$(E_{pb}-E_r+e_p)^2-(E_{pb}-e_o)^2-(iZ)^2$$

which corresponds to the Equation 21. Initially, the left-hand side of the Equation 21 is less than the right-hand side since the current i is almost zero; therefore, the output of the analog adder circuit will be positive. The output of the comparator 312 will be high, and the output of the exclusive-OR gate will be high. Thus, the transistor 34 will continue to be active, and the control signal 300 will continue to be low, causing the transistor 32 to be inactive.

Since the absolute magnitude of the current i becomes larger as it becomes more negative along the segment 118 of FIG. 5a, the inequality of the Equation 22 will become satisfied at the location 120 of FIG. 5a. The output of the analog adder circuit 236 will become negative, causing the output of the comparator 312 to go low. The exclusive-OR gate 316 will have two low inputs, and the output on the line 318 will go low. The transistor 34 will be turned off. The control signal on the line 300 will go high causing the transistor 32 to be turned on. Furthermore, the output of the exclusive-OR gate 298 on the line 296 will switch to a high level to cause $-e_p$ to be transmitted by the multiplexer 290 to the line 294. Therefore, according to the foregoing tables, the output of the analog adder circuit 236 will become:

$$(E_{pb}-E_r-e_p)^2-(E_{pb}-e_o)^2-(iZ)^2$$

The circuit in FIG. 6 will therefore begin solving the Equation 19. Since the left-hand side of the Equation 19 is initially greater than the right-hand side, the output of the analog adder circuit 236 will remain negative. The output of the comparator 312 will remain low, and the output of the exclusive-OR gate 316 will remain low, sustaining the transistor 32 in the on condition and sustaining the transistor 34 in the off condition. The absolute magnitude of the current i will begin decreasing along the segment 122 in FIG. 5a. When the current i passes through zero and then becomes positive at the location 128, the control voltage on the line 240 will go high causing the circuit in FIG. 6 to begin solving the Equation 18 as described above.

The circuit illustrated in FIG. 6 provides a very accurate reproduction of the reference voltage generated by the reference generator 256 on the output terminals. The circuit of FIG. 6 can be used with sinusoidal signals and with other time-varying waveforms, such as a square wave or a triangular wave. In the preferred embodiment, the reference generator can be controlled to vary both the frequency and amplitude. Furthermore, the circuit is adaptable to respond to an external reference signal and reproduce the reference signal on the output terminals 210 and 212.

The foregoing circuit is particularly advantageous in that the switching frequency is maintained at a substantially constant frequency under steady-state or near steady-state conditions, thereby facilitating the design of circuits to filter the ripple component out of the output voltage. The circuit has the further advantage that, unlike clocked fixed frequency power supplies, the circuit calculates the time at which to switch as a function of the reference voltage $E_r$ and the output voltage $e_o$. Therefore, it responds to transient load or reference conditions by temporarily altering the switching frequency to rapidly compensate for the changing conditions.

The Equations 17 and 20 can be approximated by other curves which are simpler to implement, and are satisfactory for many purposes.

The Equation 17 describes a circle in the $e_o-iZ$ plane, with center at $e_o=-E_{nb}$, $iZ=0$, and a radius of $E_{nb}+E_r+e_p$. A parabola can approximate that circle over a wide range of $e_o$ and $iZ$ around the desired operating point, $e_o=E_r$. The equation of a parabola which passes through $e_o=E_r+e_p$ at $iZ=0$, with the same radius of curvature as the Equation 17 is:

$$e_o - E_r - e_p = \frac{(iZ)^2}{2(E_{nb} + E_r + e_p)} \qquad (23)$$

and for the Equation 20 is:

$$e_o - E_r + e_p = \frac{(iZ)^2}{2(E_{pb} - E_r + e_p)} \quad (24)$$

where $e_p$ is generated as above. This implementation of the function requires only one analog multiplier or squarer device, in addition to the one required to generate $e_p$, as opposed to the three devices 228, 276, 306, illustrated in FIG. 6.

An approximation leading to a even simpler implementation is illustrated in FIG. 7 wherein like numerals designate the components described above. The ripple voltage $e_p$ is generated as above, but the Equations 17 through 22 are approximated by a single straight line, on the form $$e_o - E_r \pm K_1 e_p = K_2 iZ \quad (25)$$

where the sign of the third term of the left side of the Equation 25 is changed when transistor 32 is turned on or off. $K_1$ and $K_2$ are chosen such that a ripple voltage of $\pm e_p$ occurs at steady state or near steady state conditions, thus assuring constant switching frequency.

The inputs to a voltage addition and subtraction circuit 400 are a line 402 connected to the positive bus voltage 26; a line 404 connected to the power common 16; a line 406 connected to the negative bus voltage 28; and a line 408 the output voltage $e_o$ on the line 212. The voltage in the Equation 10, $E_{pb}$, is the difference in voltage between the voltage on the bus 26 and the common 16; and $E_{nb}$ is the difference in voltage between the common 16 and the voltage on the bus 28, or the positive magnitude of the voltage on 28 relative to 16, as before. The addition and subtraction circuit 400 computes the terms $E_{nb}+e_o$, $E_{pb}-e_o$ and $E_{pb}+E_{nb}$, using differential operational amplifiers and resistors in a manner well known to those skilled in the art. The outputs are provided on lines 410, 412, and 414 respectively. The output voltages are scaled to voltages convenient to use with computational circuits, whereas the inputs are in the hundreds of volts.

An analog multiplier/divider circuit 416 computes the function $xy/Kz$, where x is equal to $E_{nb}+E_o$ on the line 410, y is equal to $E_{pb}-e_o$ on the line 412, and z is equal to $E_{pb}+E_{nb}$ on the line 414. It may consist of a circuit such as the Motorola MC1495 integrated circuit. An output proportional to $+e_p$, is provided on a line 418. The voltage on the line 418 is inverted by an analog inverter amplifier 420 and provided on a line 422 as a voltage proportional to $-e_p$. Both the normal signal on the line 418 and inverted signal on the line 422 are applied as inputs to a 2:1 analog multiplexer 424. A control voltage on a line 426 determines which of the two inputs are provided to the output of the multiplexer 424 on a line 428. If the voltage on the line 426 is a logic high, the inverted signal (i.e., $-e_p$) is applied to the line 428. If the voltage on line 426 is a logic low, the normal signal (i.e., $+e_p$) is applied to the line 428. The line 428 is connected to one side of a resistor 430. The other side of the resistor 430 is connected to a summing node 432. A voltage reference, such as the voltage reference 256, described above, is connected to one side of a resistor 434. The other side of the resistor 434 is connected to the summing node 432 via a line 436. The output voltage $e_o$ on the line 210 is connected via a line 437 to one side of a resistor 438. The other side of the resistor 438 is connected to the summing node 432. The resistor 222, connected to the output of the current transformer 220, as before, is connected to one side of a resistor 440. The other side of the resistor 440 is connected to the summing node 432. The magnitudes of the resistances of the resistors 222 and 440 are advantageously chosen to scale the current provided to the summing node 432 to be proportional to $K_2 iZ$. Thus, the summing node 432 solves either the equation $e_o - E_r + K_1 e_p = K_2 iZ$ or the equation $e_o - E_r - K_1 e_p = K_1 iZ$, depending upon the control voltage on the line 426 connected to the multiplexer 424.

The summing node 432 is connected to the positive input of a comparator 442. The negative input of the comparator 442 is connected to the output ground reference 211. The comparator 442 has a logic high output on a line 444 when its positive input, connected to summing node 432, is positive and a low output when the voltage on the summing node 432 is negative. Thus, the output of the comparator switches when the Equation 25 is satisfied.

The output of comparator 442 drives a logical inverter 446 via a line 448. It also drives a driver circuit 450, which appropriately isolates and changes the power level and whose output drives transistor 34 through line 54. The output of inverter 446 is connected to a drive circuit 452 which which drives transistor 32. The output of the inverter 446 also controls the multiplexer through the line 426. When the voltage on the line 426 is a logic high, transistor 32 is on, and negative voltage proportional to $e_p$ (i.e., $-K_1 e_p$) is applied to summing junction 432 through the resistor 430, and vice versa. When the transistor 32 is on the comparator 442 will be solving the equation $K_2 iZ - e_o + E_r - K_1 e_p = 0$. When the current i becomes sufficiently large, the voltage at the summing node 432 will be greater than zero volts and the output of the comparator 442 will switch to its high state causing the transistor 32 to switch off and the transistor 34 to switch on. The multiplexer 424 will select $+K_1 e_p$ to the summing node 432 and thus hold the voltage on the node 432 positive until the current i becomes sufficiently negative to cause the voltage on the node to become negative and switch the comparator 442 to its low state. When the comparator 442 switches to its low state, the transistor 34 will be turned off and the transistor 32 will be turned on.

All three implementations of the invention hold the switching frequency constant over a range of reference voltage under steady state or slowly varying conditions. If, for example, the reference is changed abruptly from one level to another as in a square wave, the output will reach its new value without extra steps or overshoot in the case of the implementation of FIG. 6. It will have at least one moderate overshoot using the parabolic approximation, (not shown), and several overshoots using the implementation of FIG. 7. Furthermore, the number of overshoots will vary depending on the magnitude of the step and final value. Thus, if it is desired to only track steady state or slowly moving references (sine waves up to 1 kHz with a switching frequency of approximately 25 kHz) the implementation of FIG. 7 is sufficient, and much simpler. If square waves or high frequency outputs are required, a higher degree of approximation such as that provided by the preferred embodiment of FIG. 6 is advantageously used.

For simplicity, the foregoing description pertains to a type of inverter called a half-bridge which has two switching devices alternately connecting the inductor to a source of positive and negative DC voltage. The invention described herein is equally applicable to a type of inverter called a full-bridge, which uses four switching devices which act to apply a single source of DC voltage in either a normal or reversed polarity. FIG. 8 illustrates such an inverter.

A transistor 32A and a transistor 32B both have their collectors connected to a positive bus 26. The emitter of the transistor 32A is connected to the collector of a transistor 34A and the emitter of the transistor 32B is connected to the collector of a transistor 34B. The emitters of the transistors 34A and 34B are connected to an input ground or zero-voltage reference 16. The common connection of the emitter of the transistor 32A and the collector of the transistor 34A is connected to one side of the inductor 38. The other side of the inductor 38 is connected to the capacitor 42 and transformer 200 as before. The common connection of the emitter of the transistor 32B and the collector of the transistor 34B is connected to the primary side of the current transformer 220, and to the transformer 200 as set forth in FIGS. 6 and 7.

One mode of operation of such an inverter is to switch transistors 32A and 32B on together, and then the transistors 32B and 34A on together. Thus, current will flow through the inductor 38 in alternating directions. In that case, all of the above equations apply, except that $E_{nb}=E_{pb}$, can be replaced simply by $E_b/2$, where $E_b$ is the difference in voltage between the line 16 and the line 14 of FIG. 8.

An alternate mode of switching is to have the transistor 34B on for an entire positive half-cycle of $E_r$. Transistors 32A and 34A turn on and off at the desired switching frequency. Again, the same equations can be used, except during the positive half cycles of $E_r$, $E_{nb}$ is replaced by 0 (zero) and $E_{pb}$, is replaced by $E_b$. During the negative half-cycle, the transistor 34B is off, the transistor 32B is on, and, in the equations, $E_{nb}$ is replaced by Eb, and Epb by zero.

Other modes of switching can be used, but the equations presented above will apply with only slight modification.

Although described above with respect to analog computational components, the foregoing embodiments can be advantageously implemented with digital computational components such as microprocessors, arithmetic coprocessors, and logic arrays.

What is claimed is:

1. A power supply, powered by a power source, for generating an output signal to a load, which output signal includes a desired signal waveform on which is superimposed a ripple waveform, comprising:
   a switch for alternately connecting and disconnecting said load to and from said power source;
   a filtering element for smoothing the application of said output signal to said load, to provide said desired signal waveform on which is superimposed a ripple waveform; and
   a control circuit responsive to a current in said filtering element for operating said switch at times to generate a varying instantaneous ripple waveform as a function of said desired signal waveform to provide a substantially constant selected frequency for said ripple waveform.

2. A power supply, powered by a power source, for generating an output voltage proportional to a reference voltage, comprising:
   an output circuit which generates said output voltage;
   a semiconductor switch having an active state to alternately connect and disconnect said output circuit to and from said power source; and
   a control circuit for periodically activating said semiconductor switch at a selected frequency, said control circuit comprising:
      a first means for calculating a peak ripple voltage as a function of said selected frequency and said output voltage, and for generating a signal proportional to said peak ripple voltage;
      a second means for generating a signal proportional to a function of the current through a filtering element in said output circuit; and
      a third means responsive to said signals generated by said first and second means, to a signal proportional to said reference voltage, and to a signal proportional to said output voltage, said third means generating an output signal connected to said semiconductor switch to selectively activate said semiconductor switch.

3. A method of controlling a semiconductor switch to periodically connect an output circuit to a voltage source to generate an output voltage having a predetermined desired voltage component and a ripple voltage component, said ripple voltage component having a selected frequency and an amplitude controlled to maintain said selected frequency, comprising the steps of:
   measuring the current through a filter element in said output circuit;
   calculating a peak ripple voltage as a function of an instantaneous output voltage and said desired ripple frequency; and
   comparing a function of said current and said output voltage with a function of said peak ripple voltage, and switching said switch when said functions are balanced to provide said output voltage.

4. A method of generating an output voltage having a desired voltage component and ripple voltage component, said ripple voltage component having a selected frequency, comprising the steps of:
   measuring the current in a filter component in an output circuit which generates said output voltage;
   calculating a peak ripple voltage as a function of said selected frequency and the instantaneous amplitude of said output voltage; and
   alternately connecting and disconnecting said output circuit to and from a power source when a function of said current is equal to a function of said output voltage, said desired voltage component and said calculated peak ripple voltage.

5. A power supply powered by a power source, for generating an output voltage having a desired voltage component responsive to a reference signal and having a ripple voltage component superimposed on said desired voltage component, comprising:
   a semiconductor switch which is periodically activated to connect said power source to an output circuit;
   a first computational circuit responsive to said output voltage which computes an instantaneous peak value for said ripple voltage component such that the frequency of said ripple voltage can be maintained at a substantially constant selected frequency; and
   a second computational circuit responsive to a function of said first computational circuit, the instantaneous current through a filter element in said output circuit, and to the instantaneous amplitude of said output voltage, which calculates the time to activate and deactivate said semiconductor switch at said selected frequency while maintaining the amplitude of said ripple voltage component within said calculated peak value.

6. A power supply, powered by a power source, having an output circuit for generating an output voltage having a desired voltage component and a ripple voltage component superimposed on said desired voltage component, comprising:
a semiconductor switch which is periodically activated to connect said power source to said output circuit;
a filtering element for smoothing said output voltage; and
a feedback circuit responsive to the current in said filtering element which calculates the time at which the switch must be activated in order that the ripple voltage component will reach a predetermined peak voltage that varies with the magnitude of said desired voltage component.

7. A power supply as defined in claim 6 wherein said feedback circuit compares a function of said current against a function of said ripple voltage and activates said switch when said functions are balanced.

8. The power supply as defined in claim 7 wherein said feedback circuit solves the equation:

$$(E_{nb}+e_o)^2+(iZ)^2=(E_{nb}+E_r+e_p)^2$$

where $E_{nb}$ is the magnitude of a negative source voltage, $e_o$ is the instantaneous output voltage, $iZ$ is proportional to the current through the filtering element, $E_r$ is a reference voltage proportional to the desired voltage component, and $e_p$ is the peak ripple voltage.

9. The power supply as defined in claim 8 wherein said feedback circuit calculates said peak ripple voltage according to the equation:

$$e_p=(E_{nb}+e_o)(E_{pb}-e_o)/16f^2LC(E_{pb}+E_{nb});$$

where f is a preselected frequency, L and C are magnitudes of filter elements, and $E_{pb}$ is a positive bus voltage.

10. The power supply as defined in claim 7 wherein said feedback circuit solves the equation:

$$(E_{pb}-e_o)^2+(iZ)^2=(E_{pb}-E_r+e_p)^2;$$

where $E_{pb}$ is the magnitude of a positive source voltage, $e_o$ is the instantaneous output voltage, $iZ$ is proportional to the current through the filter element, $E_r$ is a reference voltage proportional to the desired voltage component, and $e_p$ is the peak ripple voltage.

11. The method as defined in claim 10 wherein feedback circuit calculates said peak ripple voltage according to the equation:

$$e_p=(E_{nb}+e_o)(E_{pb}-e_o)/16f^2LC(E_{pb}+E_{nb});$$

where f ix a preselected frequency, L and C are magnitudes of filter elements, and $E_{nb}$ is a negative bus voltage.

12. The power supply as defined in claim 7 wherein said feedback circuit solves the equation:

$$e_o-E_r\pm K_1e_p=K_2iZ$$

where $e_o$ is the instantaneous output voltage, $E_r$ is a reference voltage, $K_1e_p$ is proportional to the peak ripple voltage, and $K_2iZ$ is proportional to the current through the filtering element.

13. The power supply as defined in claim 12 wherein said feedback circuit calculates said peak ripple voltage $e_p$ according to the equation:

$$e_p=(E_{nb}+e_o)(E_{pb}-e_o)/16f^2LC(E_{pb}+E_{nb});$$

where f is a preselected frequency, L and C are magnitudes of filter elements, and $E_{nb}$ and $E_{pb}$ are negative and positive bus voltages.

14. A method of periodically activating a semiconductor switch to connect a power source to an output circuit to generate an output voltage having a desired voltage component and a ripple voltage component superimposed on said desired voltage component, comprising the steps of:
monitoring the current in a filtering element in said output circuit; and
calculating the time at which the switch must be activated in order that the ripple voltage component will reach a predetermined peak voltage, said calculating step including the steps of:
calculating said predetermined peak voltage as a function of said desired voltage component;
comparing a function of said current with a function of said predetermined peak voltage; and
activating said switch when said functions are balanced.

15. The method as defined in claim 14 wherein said calculating step solves the equation:

$$(E_{nb}+e_o)^2+(iZ)^2=(E_{nb}+E_r+e_p)^2;$$

where $E_{nb}$ is the magnitude of a negative source voltage, $e_o$ is the instantaneous output voltage, $iZ$ is proportional to the current through the filter element, $E_r$ is a reference voltage proportional to the desired voltage element, and $e_p$ is the peak ripple voltage.

16. The method as defined in claim 15 wherein said peak ripple voltage is calculated according to the equation:

$$e_p=(E_{nb}+e_o)(E_{pb}-e_o)/16f^2LC(E_{pb}+E_{nb});$$

where f is a preselected frequency, L and C are magnitudes of filter elements, and $E_{pb}$ is the magnitude of a positive bus voltage.

17. The method as defined in claim 14 wherein said calculating step solves the equation:

$$(E_{pb}-e_o)^2+(iZ)^2=(E_{pb}-E_r+e_p)^2;$$

where $E_{pb}$ is the magnitude of a positive source voltage, $e_o$ is the instantaneous output voltage, $iZ$ is proportional to the current through the filter element, $E_r$ is a reference voltage proportional to the desired voltage component, and $e_p$ is the peak ripple voltage.

18. The method as defined in claim 17 wherein said peak ripple voltage is calculated according to the equation:

$$e_p=(E_{nb}+e_o)(E_{pb}-e_o)/16f^2LC(E_{pb}+E_{nb});$$

where f is a preselected frequency, L and C are magnitudes of filter elements, and $E_{nb}$ is the magnitude of a negative bus voltage.

19. The method as defined in claim 14 wherein said calculating step solves the equation:

$$e_o - E_r \pm K_1 e_p = K_2 iZ;$$

where $e_o$ is the instantaneous output voltage, $E_r$ is a reference voltage, $K_1 e_p$ is proportional to the peak ripple voltage, and $K_2 iZ$ is proportional to the current through the filter element.

20. The method as defined in claim 19 wherein said peak ripple voltage is calculated according to the equation:

$$e_p = (E_{nb} + e_o)(E_{pb} - e_o)/16 f^2 LC(E_{pb} + E_{nb});$$

where f is a preselected frequency, L and C are magnitudes of filter elements, and $E_{nb}$ and $E_{pb}$ are the magnitudes of negative and positive bus voltages.

21. The method defined in claim 14 wherein said calculating step solves the equation:

$$e_o - E_r - e_p = \frac{(iZ)^2}{2(E_{nb} - E_r + e_p)}$$

where $e_o$ is the instantaneous output voltage, $E_r$ is a reference voltage, $e_p$ is the peak ripple voltage, $E_{nb}$ is the magnitude of a negative bus voltage, and iZ is proportional to the current through the filter element.

22. The method as defined in claim 21 wherein said peak ripple voltage is calculated according to the equation:

$$e_p = (E_{nb} + e_o)(E_{pb} - e_o)/16 f^2 LC(E_{pb} + E_{nb});$$

where f is a preselected frequency, L and C are magnitudes of filter elements, and $E_{nb}$ and $E_{pb}$ are the magnitudes of negative and positive bus voltages.

23. The method as defined in claim 14 wherein said calculating step solves the equation:

$$e_o - E_r + e_p = \frac{(iZ)^2}{2(E_{pb} - E_r + e_p)}$$

where $e_o$ is the instantaneous output voltage, $E_r$ is a reference voltage, $e_p$ is the peak ripple voltage, $E_{pb}$ is the magnitude of a positive bus voltage, and iZ is proportional to the current through the filter element.

24. The method as defined in claim 23 wherein said peak ripple voltage is calculated according to the equation:

$$e_p = (E_{nb} + e_o)(E_{pb} - e_o)/16 f^2 LC(E_{pb} + E_{nb});$$

where f is a preselected frequency, L and C are magnitudes of filter elements, and $E_{nb}$ and $E_{pb}$ are the magnitudes of negative and positive bus voltages.

* * * * *